Aug. 4, 1953 — D. R. MEIER — 2,648,018
DYNAMOELECTRIC MACHINE MEMBER
Filed Nov. 28, 1950
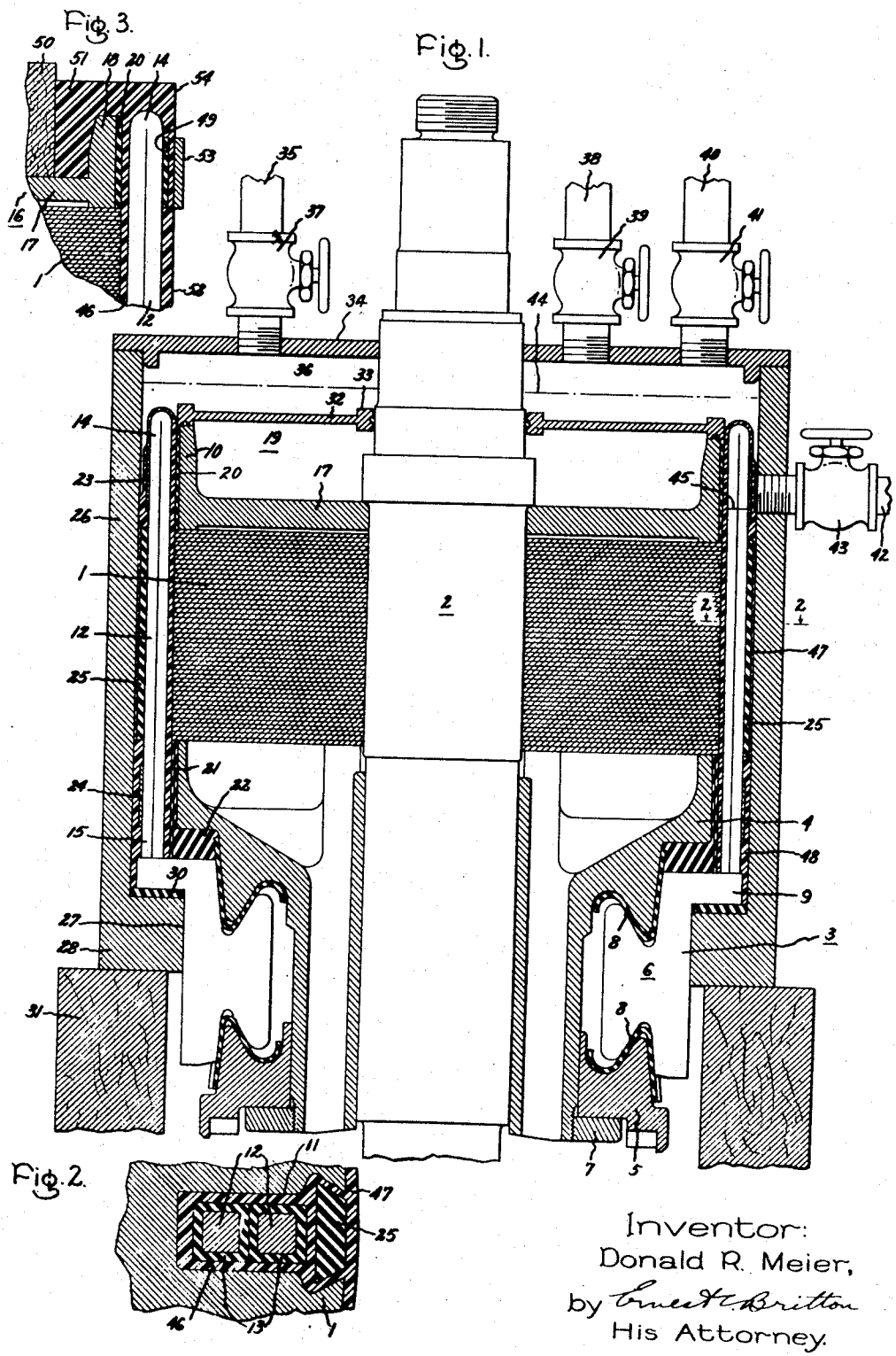
Inventor:
Donald R. Meier,
by Ernest F. Britton
His Attorney.

UNITED STATES PATENT OFFICE 2,648,018

DYNAMOELECTRIC MACHINE MEMBER

Donald R. Meier, Erie, Pa., assignor to General Electric Company, a corporation of New York Application November 28, 1950, Serial No. 197,984

7 Claims. (Cl. 310—43)

This invention relates to members for dynamoelectric machines such as stator and rotor members and more particularly to armatures for direct current dynamoelectric machines.

In the manufacture of core members for electrical apparatus, particularly armatures for direct current dynamoelectric machines, there is considerable labor and expense involved in providing turn and ground insulation for the windings. It is therefore desirable to provide an armature construction in which the armature coils are placed in the slots with no more than a minimum of turn insulation and the ground insulation cast around the conductors. In manufacturing such an armature construction, conductors already having turn insulation are placed in the armature slots and the armature is then placed in an open face mould having an inside contour corresponding to the desired outside contour of the finished armature. A suitable liquid casting resin is then introduced into the mould in sufficient quantity to fill the slots encasing the conductors and to surround the circumferential surface of the armature. The resin is then cured by the application of heat and the mould removed. With this method of assembly, ground taping of the armature conductors is eliminated, and coils can be provided which are initially loose in the slots so that they can be easily placed therein rather than driven in. The use of a liquid casting resin which can be poured into an open face mould and which is fluid enough to fill all of the voids in the armature structure eliminates the complicated building up of various parts and shapes of insulation pieces to fill cavities in the structure and provides a suitable surface for the application of binding wire. On small armatures which are not too highly stressed, this method may eliminate the operation of driving slot wedges into the slots to hold the coils in position, the casting resin being sufficiently strong to act as a slot wedge. Furthermore, on small armatures it may be possible to eliminate the use of binding wire relying on the casting resin alone to hold the end turns against centrifugal force.

An object of this invention is to provide an improved member for a dynamoelectric machine.

Further objects and advantages of this invention will become apparent and the invention will be better understood by reference to the following description in the accompanying drawing, and the features of novelty which characterize this invention will be pointed out with particularity in the claims annexed to and forming a part of this specification.

In accordance with this invention, a core formed of magnetic material having winding slots formed therein is provided having a commutator on one side and an end turn support on the other side. The end turn support has an annular portion and a flange portion formed at its circumferential edge for supporting the winding end turns, the flange portion defining a cavity. Windings are then placed in the slots with end turn portions extending beyond the slots on the side remote from the commutator and lying on the flange portion of the end turn support. Other winding portions extend beyond the slots for connection to the commutator. The winding extensions are then connected to the commutator and loose fitting slot wedges may be inserted in the slots over the windings. The end turns and the winding extensions on the commutator side may then be suitably bound, as by the use of binding wire, to resist the action of centrifugal force. The core with the windings in place therein is then placed in a vertical open face mould having an opening in the bottom with the commutator extending downwardly therethrough. The end turn support cavity may then be sealed to prevent the entrance of the casting resin. The mould may then be evacuated and a liquid casting resin is introduced thereto to a level above the end turns so that the resin flows into the cavities filling the spaces in the slots unoccupied by the windings and wedges and surrounding the circumferential surface of the core. Air pressure may then be applied to the mould cavity in order to force the resin into the spaces in the core, or alternatively, air pressure may be applied by placing the complete mould in a suitable pressure vessel. A portion of the still liquid resin may be drained off so that a substantial length of the end turns is exposed. Thus, the end turns will be coated with a thin layer of the resin rather than being encased in a large mass. The resin may then be cured by the application of heat with the result that the windings and wedges are encased and held in place in the slots and the circumferential surface of the core is surrounded by the cured moulding material, however, some resins may require the application of heat for curing. The sealing means is then removed from the end turn support cavity and the completed armature structure is removed from the mould. In some armatures, a thick mass of resin at the end remote from the commutator may not be objectionable and in that event, the seal and draining operation may be omitted.

In the drawing, Fig. 1 is a cross sectional view illustrating the improved armature of this invention and the method of making the same; Fig. 2 is a fragmentary cross sectional view taken along the line 2—2 of Fig. 1, and Fig. 3 is a fragmentary, cross sectional view illustrating a modified form of the invention.

Referring now to Figs. 1 and 2 there is shown an armature assembly comprising a core portion 1 formed of a plurality of laminations of magnetic material mounted on a shaft 2. A commutator 3 is mounted on a shaft 2 on one side of the core 1 and comprises a hub portion 4 and a V-block portion 5 which support the commutator bars 6. The V-block 5 is held in tight engagement with the commutator bars 6 by means of a nut 7 engaging suitable threads on the hub portion 4. Commutator cones 8 formed of suitable insulating material insulate the commutator bars 6 from the hub 4 and V-block 5. The commutator bars 6 are provided with risers 9 for connection to the armature windings.

The core member 1 of the armature is formed with a plurality of winding slots 11 formed therein. As the first step in the assembly of the complete armature, the armature windings 12, already provided with turn insulation 13, are placed in the winding slots 11. These conductors are loose fitting in the slots and may be merely placed in the slots 11 rather than being driven in. The armature windings 12 are provided with end turn portions 14 extending beyond the slots 11 on the side remote from the commutator 3 and extension portions 15 also extending beyond the slots 11 on the side of the commutator. The armature assembly includes an end turn supporting member 16 secured to the shaft 2 on the side of the core 1 remote from the commutator 3. The end turn supporting member 16 comprises an annular portion 17 and a flange portion 18 at its outer peripheral edge which defines a cavity 19. When assembled in the slots 11, the end turns 14 of the armature windings 12 lie on the flange portion 18 of the end turn supporting member 16. Prior to the positioning of the armature windings 12 in the slots 11, the peripheral surface of the flange 18 may be insulated with suitable insulating material 20, for example, glass tape. The peripheral surface of the hub member 4 is also insulated by suitable insulating material 21, for example, glass tape, and the space 22 behind the commutator risers 9 is filled with suitable insulating material, for example, glass tape stuffed into the space. After the armature windings 12 are assembled in the slots 11, the extensions 15 are connected to the commutator risers 9 in any suitable manner, as by dip soldering. In order to hold the end turns 14 and the extensions 15 of the windings 12 against the action of centrifugal force, suitable binding rings 23 and 24 are applied over the end turns and commutator extensions. These rings may be formed of a plurality of turns of binding wire, or alternatively may be formed as a solid band which is shrunk on over the winding. Suitable insulation, such as glass cloth, may be necessary under the binding ring. In order to assist in holding the windings 12 in place in the slots 11, loose fitting slot wedges 25 may be assembled in the slots 11 over the windings. These wedges will be tightened in the slots by the curing of the casting resin filling the spaces, as will be hereinafter described.

The armature assembly with the windings 12 and slot wedges 25 assembled in the slots 11 is then placed in a suitable vertical mould 26 having an inside contour corresponding to the desired outside contour of the finished armature. The mould 26 is provided with an opening 27 at its bottom through which the commutator 3 extends and a reentrant flange portion 28 which provides the support for the armature assembly through the commutator risers 9. An annular seal 30 is provided between the reentrant flange portion 28 of the mould 26 and the commutator risers 9 to prevent the moulding material from reaching the commutator surface. The mould 26 is supported in a vertical position by any suitable support, as at 31. After the armature assembly has been placed in the mould, an annular sealing member 32 having an opening 33 for receiving the shaft 2 may be placed over the shaft and engages the flange portion 18 of the end turn supporting member 16 in order to seal the cavity 19 against the entrance of the casting resin. The mould cover 34 is then assembled on the body portion of the mould 26. The mould cover 34 may be provided with a line 35 communicating with the mould cavity 36 adapted to be connected to a suitable vacuum source through valve 37 for evacuating the mould cavity 36. The cover 34 may also be provided with line 38 communicating with the cavity 36 and adapted to be connected to a suitable source of air pressure through valve 39 for introducing pressure to the mould cavity. Line 40 is adapted to be connected to the source of the liquid casting resin through valve 41 for introducing the resin to the mould cavity 36. A drain line 42 communicates with the mould cavity 36 at a level below the extremities of the end turns 14 and serves to drain off part of the moulding material through valve 43, as will hereinafter be described.

In the casting operation, the mould cavity 36 may be evacuated by means of vacuum line 35 and a liquid casting resin introduced to the cavity through the line 40 to the level shown by the dashed line 44. Air pressure may then be introduced to the cavity through the line 38 in order to facilitate the entry of the resin into the spaces between the slots 11 and the windings 12, between the slots and the wedges 25 and the space between the circumferential surface of the core 1 and the interior surface of the mould. After a short period of time sufficient to permit the end turns 14 to become well coated with resin, a quantity of the liquid resin may be drained off through drain line 42 to the level shown by the dashed line 45. This leaves the end turns 14 well coated with a thin coating of resin, but does not leave them completely covered with a thick solid ring of resin as would be the case when the draining operation is not provided. This improves the flexibility of the end turns 14, increases the heat transfer coefficient, and in addition saves resin. Thus, the liquid resin has completely filled the spaces between the walls of the slots 11 and the windings 12, as at 46 and the spaces between the walls of the slots and the wedges 25. In addition, the circumferential surface of the core 1 and the commutator winding extensions 24 are covered by a cast coating of resin, as at 47 and 48. The resin is then cured by the application of heat so that the windings 12 and the slot wedges 25 are completely encased and held in place in the slots 11 and the exterior surface of the core is surrounded by the hardened resinous material. If the draining operation described above has been used, the end turns 14 are coated by a thin layer of the hardened resin integrally joined to the material surrounding the core member 1. The mould cover 34 and the seal 32 are then removed and the completed armature assembly removed from the mould 26. While the evacuation of the mould cavity 36 prior to the introduction of the casting resin was described, this may not be necessary and the required filling action may be procured by alternately applying and releasing air pressure through the line 38. When evacuation is used, a vacuum of 23 inches mercury was found to be sufficient. An air pressure of about 90 pounds per square inch was found to be sufficient to force the resin into the voids in the windings.

Referring now to Fig. 3 in which like parts are indicated by like reference numerals, there is shown an armature assembly including a core portion 1 formed of a plurality of laminations of magnetic material and an end turn supporting member 16 comprising an annular portion 17 and a flange portion 18. In assembly, the peripheral surface of flange 18 is insulated with suitable insulating material 20, for example glass tape. The armature windings 12, already provided with turn insulation, are then placed in the winding slots of the core, these windings being loose fitting in the slots so that they are not required to be driven in. The armature windings 12 are provided with end turn portions 14 which lie on the flange portion 18 and the insulating material 20. After the windings 12 have been positioned in the slots, the end turn portions 14 are wrapped with suitable insulating material 49, for example glass tape, which is anchored so that it will not come loose during the casting processes. The armature is then placed in a suitable mould, as described hereinbefore, and a suitable liquid casting resin is introduced thereto. Rather than completely seal the cavity defined by the flange 18 of the end turn supporting member 16, as shown in Fig. 1, a plug member 50 may be provided so that the resin will form an annular mass 51 surrounding the flange portion 18 and the end turns 14 in addition to completely filling the space between the walls of the slots and the windings 12 as at 46. Slot wedges, as shown in Fig. 1, may not be needed and therefore the casting resin will fill the slots above the windings 12 and form a smooth circumferential surface, as at 52. After the armature has been cast and cured, as more fully described above, it is removed from the mould and the plug 50 removed. A suitable binding ring 53 is then applied over the end turns 14 on the resin cast surface 52. These rings may be formed of a plurality of turns of binding wire or alternatively may be formed as a solid band which is shrunk on. In order to facilitate the application of a solid band over the cast outer surface 52, the upper extremity of the outer surface may be slightly tapered as at 54. It will be readily understood that a similar binding ring can be applied in the same manner over the end turn extensions at the commutator end of the armature.

It will be readily apparent that any suitable form of casting resin may be used in the performance of this invention, for example, a polyester liquid type casting resin which will harden under the influence of heat, however other resins which do not require the direct application of heat are known in the art. Such resinous casting material may include copolymers of styrene and other copolymerizable materials, for example, styrene and an unsaturated alkyd resin, styrene and a cross-linking agent, for example, divinyl benzene, or styrene and dialkyl phthalate, etc. A filler, for example, 30% talc, may be used. These materials cure from a liquid to a solid state by addition or vinyl type polymerization. In curing, gaseous products are neither formed nor is inert solvent eliminated. The polymerization of the resin is effected by the controlled use of a catalyst, for example, benzoyl peroxide and/or heat. Pressure is not required to effect a cure of the types of resins enumerated above. The casting resin pointed out above is, of course, only an example of many such resins well known in the art and it will be readily understood that any suitable casting resin may be utilized. With the polyester liquid type resin described above, curing of two hours at 60° C., two hours at 80° C., and eight hours at 100° C. was found to produce a satisfactory product.

As pointed out above, this improved armature construction eliminates ground taping and permits the coils to be placed into the armature slots rather than driven in. The casting resin takes the place of the usual build-up of various types and shapes of insulation pieces to fill all the voids in the mechanical structure and on small armatures which are not too highly stressed, the use of the casting resin may eliminate the necessity for slot wedges. Furthermore, on small armatures it may be possible to eliminate the bands 23 and 24 and to rely on the casting resin alone to hold the end turns in place. With this construction, an armature may not have to be dipped, baked or rebanded and rewound periodically and furthermore, the armature is easily kept clean since the entire peripheral surface is smooth and easily wiped with a cloth containing solvent.

The resin casting technique described above makes use of materials which cure by polymerization, no gases being given off during curing. It is further not necessary to maintain a pressure during the cure. Thus, with this improved casting resin method, the mould may be partially filled producing an open face mould, and the resin cured by the application of heat without pressure and without the troublesome evolution of gas. The filling of the mould is accomplished by utilizing a casting resin in the liquid state which merely flows into all of the cavities in the armature structure. Evacuation of the mould and/or the application of pressure merely facilitates the filling operation. Conventional moulding materials must be forced into the mould cavities, sometimes under very high pressure, and release gases during curing unless pressure is maintained during the cure. Furthermore, with conventional moulding materials, the mould must be filled completely or the material will expand as it cures producing a soft porous mass. With the improved construction of this invention, however, the resin does not have to be forced into the mould under pressure and is cured by the application of heat only without any pressure above normal atmospheric pressure, no gases being given off in the process.

It is now readily apparent that this invention provides an improved armature construction which reduces the cost of manufacture and improves the product.

While I have illustrated and described a specific embodiment of my invention, further modifications and improvements will occur to those skilled in the art. I desire it to be understood, therefore, that this invention is not limited to the specific form shown and I intend in the appended claims to cover all such modifications

What I claim as new and desire to secure by Letters Patent of the United States is:

1. A member for a dynamoelectric machine comprising a core formed of magnetic material and having winding slots formed therein, windings loosely fitting in said slots, a mass of solidified solventless polyester-type cast resin filling said slots and encasing said windings so as to secure said windings in said slots, and a coating of said resin on the circumferential surface of said core and integrally joined to said mass.

2. A member for a dynamoelectric machine comprising a core formed of magnetic material and having winding slots formed therein, windings having slot portions loosely fitting in said slots and having end turn portions extending therefrom, a mass of solidified solventless polyester-type cast resin filling said slots and encasing said winding slot portions so as to secure said windings in said slots, and a coating of said resin on said end turn portions and the circumferential surface of said core integrally joined to said mass.

3. A member for a dynamoelectric machine comprising a core formed of magnetic material and having winding slots formed therein, windings having slot portions loosely fitting in said slots and having end turn portions extending therefrom, a mass of solidified solventless polyester-type cast resin filling said slots and encasing said winding slot portions so as to secure said windings in said slots, a cast casing of said resin enclosing said end turn portions, and a cast coating of said resin on the circumferential surface of said core integrally joined to said casing and said mass.

4. A member for a dynamoelectric machine comprising a core formed of magnetic material and having winding slots formed therein, windings loosely fitting in said slots, slot wedges loosely fitting in said slots over said windings, a mass of solidified solventless polyester-type cast resin filling said slots and encasing said windings and slot wedges so as to secure said windings in said slots, and a cast coating of said resin on the circumferential surface of said core integrally joined to said mass.

5. A rotor member for a dynamoelectric machine comprising a core formed of magnetic material and having winding slots formed therein, windings having slot portions loosely fitting in said slots and having end turn portions extending therefrom, binding means circumferentially embracing said end turn portions for resisting centrifugal force, a mass of solidified solventless polyester-type cast resin filling said slots and encasing said winding slot portions so as to secure said windings in said slots, and a coating of said resin integrally joined to said mass covering said end turns and said binding means and the circumferential surface of said core.

6. A rotor member for a dynamoelectric machine comprising a core formed of magnetic material and having winding slots formed therein, windings having slot portions loosely fitting in said slots and having end turn portions extending therefrom, an end turn supporting member on said core, a mass of solidified solventless polyester-type cast resin filling said slots and encasing said winding slot portions so as to secure said windings in said slots, a casing of said resin enclosing said end turn portions and said end turn support, and a coating of said resin on the circumferential surface of said core integrally joined to said casing and said mass.

7. A rotor member for a dynamoelectric machine comprising a core formed of magnetic material having winding slots formed therein, windings having slot portions loosely fitting in said slots and having end turn portions extending therefrom, a mass of solidified solventless polyester-type cast resin filling said slots and encasing said winding slot portions in said slots so as to secure said portions in said slots, a coating of said resin covering said end turns and the circumferential surface of said core integrally joined to said mass, and binding means circumferentially embracing said end turns over said cast resin coating for resisting centrifugal force.

DONALD R. MEIER.

References Cited in the file of this patent

UNITED STATES PATENTS

| Number | Name | Date |
| --- | --- | --- |
| 1,875,207 | Apple | Aug. 30, 1932 |
| 1,911,341 | Apple | May 30, 1933 |
| 1,921,111 | Apple | Aug. 8, 1933 |
| 2,400,891 | Sigmund | May 26, 1946 |
| 2,414,525 | Hill | Jan. 21, 1947 |
| 2,446,999 | Camilli | Aug. 17, 1948 |
| 2,495,172 | Leape | Jan. 17, 1950 |